Aug. 6, 1940.    W. RAUTENSTRAUCH    2,210,004

PACKING

Filed Feb. 20, 1932    2 Sheets-Sheet 1

Aug. 6, 1940.  W. RAUTENSTRAUCH  2,210,004
PACKING
Filed Feb. 20, 1932  2 Sheets-Sheet 2

Walter Rautenstrauch INVENTOR
Wm. S. Pritchard BY ATTORNEY

Patented Aug. 6, 1940

2,210,004

UNITED STATES PATENT OFFICE 2,210,004

PACKING

Walter Rautenstrauch, Palisade, N. J., assignor to The Dorin Corporation, Union City, N. J., a corporation of New Jersey Application February 20, 1932, Serial No. 594,364

10 Claims. (Cl. 288—8)

This invention relates to packings and more particularly to fiber-containing composition packings for use in mechanical devices for the purpose of sealing joints or connections between parts which may or may not have relative movement.

One object of this invention is to provide a fiber-containing composition packing which will have reduced friction when in contact with a moving part, with consequent less wear and longer life.

Another object of this invention is to provide a packing having a maximum of resilience in compression whereby, when it is in contact with a moving part, it will require a minimum of adjustment to prevent liquid or gas from escaping between the packing and the moving part.

The above and other objects will appear from the following description, appended claims and accompanying drawings forming a part of this specification and in which:

According to the present invention, any suitable packing composition comprising, for example, a fibrous material, lubricant and binder, causing cohesion between the component materials with or without suitable anti-friction metal, is forced under pressure through a die having an annular outlet. Although, as stated, any suitable packing composition may be employed, I have found that by employing the lubricating packing composition constituting the subject matter of copending application Serial No. 590,311, filed February 1, 1932, and comprising asbestos or other fibers, graphite or talc and powdered unalloyed antimony and a binder consisting of rubber dissolved in a suitable solvent with or without the addition of a modifying agent and vulcanizing agent, I can secure very satisfactory results.

I have found that by making a fiber containing composition packing with a major portion of the fibers extending in the direction of the longitudinal axis of the bore of the packing, hereinafter referred to as the axis of the packing, that the packing possesses the qualities of minimum friction and maximum resilience and length of life.

In order to cause the fibers to align themselves lengthwise of the axis of the packing, a mass of suitable packing composition is forced through an extrusion die. To effectively align the fibers during the manufacture of the packing, any suitable apparatus may be used. The apparatus illustrated in Figures 1, 2 and 3 of the drawings has given satisfactory results.

Figure 1:
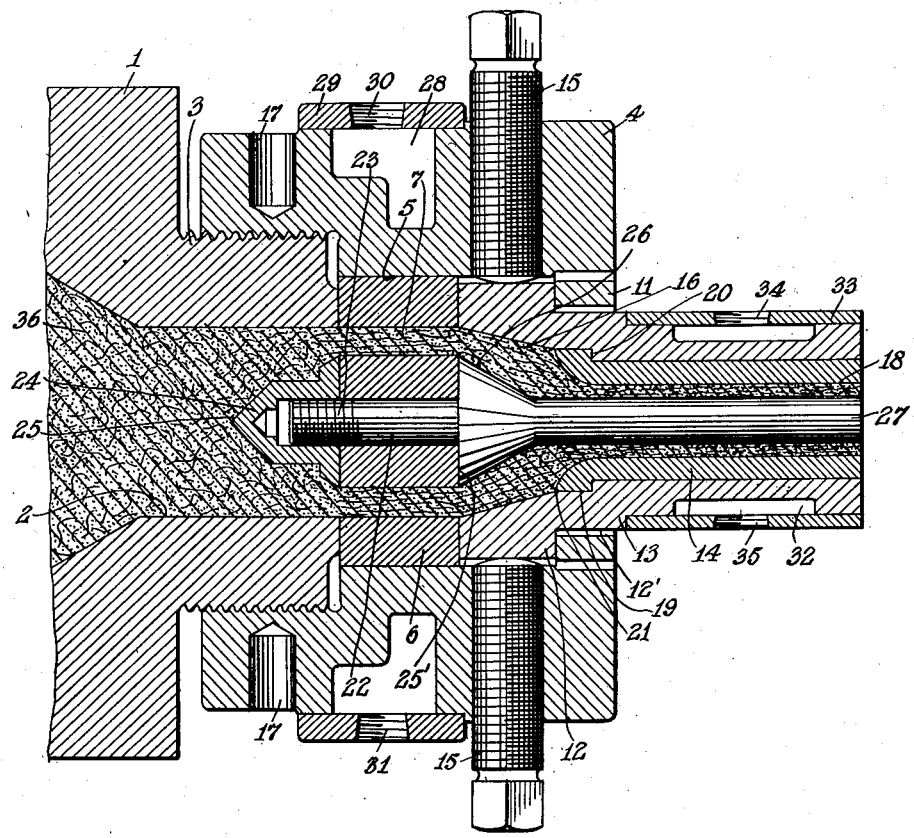
Figure 1 is a longitudinal sectional view illustrating an extrusion die used for making packings according to this invention.
Figure 2:
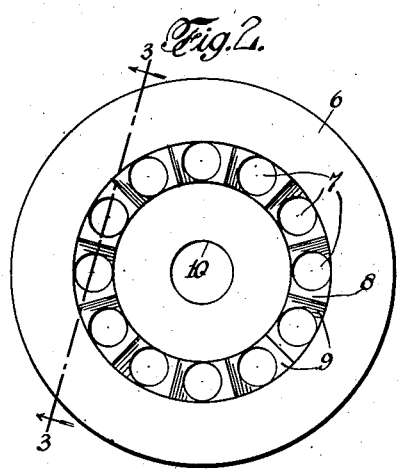
Figure 2 is a face elevation of the breaker used in the extrusion die.
Figure 3:
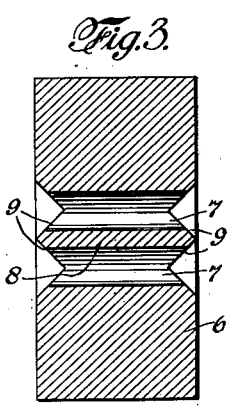
Figure 3 is a sectional view on line 3—3 of Figure 2.

In the particular embodiment of the apparatus illustrated in Figures 1, 2 and 3 of the drawings wherein like reference numerals designate like parts, the reference numeral 1 illustrates a press body having a press chamber 2 and a threaded extension 3 on which is threadedly secured a die holder 4. Seated against the end 3 of the press body and within a central bore 5 of the die holder is a breaker 6 having an annular series of openings or holes 7 with the opposite ends of the partitions 8 between each two adjacent openings 7 made V-shaped as at 9 (Fig. 3). A center hole 10 is formed in the breaker for a purpose which will presently be described.

Mounted within the die holder 4 between an annular shoulder 11 of the die holder and the breaker 6 is an enlarged inner end 12 of a die nozzle 12' which comprises a die body 13 and a die bushing 14. Set screws 15 provide means for aligning a nozzle chamber 16 of the die holder with the openings 7 in the breaker. Holes 17 are for the purpose of accommodating a spanner wrench for tightening the die holder 4 upon the screw-threaded extension 3. The die body 13 has a main bore 18 and an enlarged inner bore 19 providing an annular shoulder 20. The bushing 14 is seated in the main bore 18 of the die body 13 and has an enlarged annular flange 21 mounted in the bore 19 and seated against the shoulder 20 of the die body. Thus, it is simple to unscrew the die holder 4, remove the bushing 14, and insert in place thereof another bushing of any desired size for making packings of different outside diameters.

Extending through the central hole 10 of the breaker 6 is one end of a mandrel 22 having a screw-threaded end 23 on which is threaded a nut 24 having a conical end 25 as shown. The inner face of the nut 24 engages against one side of the breaker 6 in cooperation with the face 25' of a conical enlargement 26 of the mandrel. Extending away from the conical enlargement 26 is a cylindrical extension 27 of the mandrel which is centrally spaced from the interior wall of the bushing 14 as shown. It will be obvious that by substituting mandrels having differently-sized extensions 27, packings can be produced having various sizes of openings.

The die holder 4 is provided with an annular chamber 28 closed by a ring 29 having opposite holes 30, 31 by means of which the chamber 28 may be supplied with a suitable fluid heating medium, whereby the breaker 6 may be heated by conduction from the die holder 4 to increase the flowability and coalescing properties of the plastic mass 36 as it passes through the openings of the breaker 6.

The die body 13 is also provided with an annular chamber 32 closed by a ring 33 having opposite openings 34 and 35 by which it may also be supplied with a suitable fluid heating medium for a purpose similar to that of the chamber 28.

In operation, the chamber 2 is supplied with a quantity of fiber-containing composition packing material 36 which is forced under pressure through the openings 7 of the breaker into the chamber 16 of the die nozzle and out between the bushing 14 and mandrel extension 27.

On account of the relatively small diameter of the openings 7 in the breaker 6, the packing composition moves through these openings at comparatively high speed and under such conditions as to cause a major portion of the fibers in the composition to align themselves lengthwise of the openings 7, due to the tendency of elongated objects to move longitudinally away from an impelling force. As the composition continues beyond the breaker it passes into the die nozzle chamber 16 where the various streams of the composition issuing from the openings 7 move laterally toward each other and coalesce and pass out through the annular opening between the die bushing 14 and the mandrel extension 27 to form a single unitary tubular member 37 as illustrated in Figure 4, and having the fibers 38 thereof extending longitudinally of the axis of the tube as shown.

Figure 4:
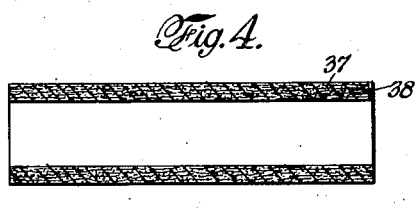
Figure 4 is a longitudinal sectional view of a length of tubular packing produced according to this invention.

After the tube 37 illustrated in Figure 4 has been produced as explained, it is cut at 39 (Fig. 5) to provide annular packings 40 of any desired length. The packings 40 can also be produced as the packing issues from the die nozzle by means of an automatically operating cutting device arranged on or adjacent the die nozzle.

Figure 5:
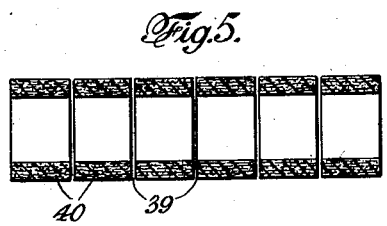
Figure 5 is a view similar to Figure 4 showing the length of packing cut into short lengths.
Figure 6:
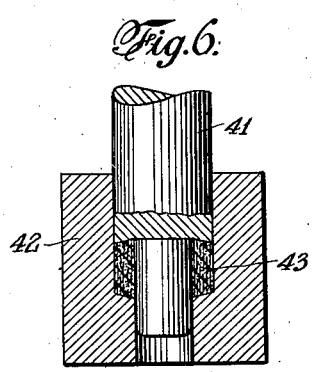
Figure 6 is a longitudinal sectional view illustrating a pressing operation carried out on one of the pieces of packing shown in Figure 5.
Figure 7:
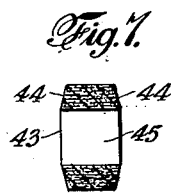
Figure 7 is a longitudinal sectional view of the finished packing produced according to Figure 6.
Figure 8:
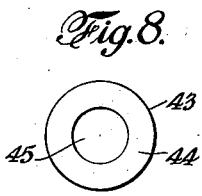
Figure 8 is an end view of the packing shown in Figure 7.

The packings 40 are preferably next subjected to a pressing operation by means of any suitable die members, such as 41 and 42 as illustrated in Figure 6. This pressing operation produces a finished annular packing 43 with accurately sized inner and outer diameters, and produces the desired beveled end faces 44. It also smooths the surface of the packing and densifies the latter. This press-forming operation is of sufficient intensity to properly size the packing, but of insufficient intensity to destroy the resilience of the packing. By suitably shaped dies, the beveled faces 44 may be made at any desired angle, or the end faces may be retained flat as shown in Figure 5.

The finished packing 43 with the fibers extending in the direction of the axis of the packing, results in a minimum of friction between an orifice or bore 45 of the packing and a moving part, such as a pump, or engine piston rod or valve stem moving longitudinally therethrough, due to the fibers extending approximately parallel to the bore 45 and thus eliminating the tendency of the packing fibers to roll laterally one upon another as would be the case if the fibers were presented in a position lateral or oblique to the direction of motion, and as a result of this lack of friction or rubbing of the fibers, the packing is subjected to less wear and therefore lasts longer.

The packing produced according to the herein disclosed method possesses both plasticity and resilience. The quality of plasticity permits the packing to be flowed or distorted as the result of pressure from the follower or gland of the stuffing box in which it is used for the purpose of making the packing perfectly fit the parts with which it engages. The longitudinal arrangement of the fibers in the packing gives the latter a maximum of resilience in compression and, therefore, the follower or gland of the stuffing box through which the force is applied to the packing to accomplish the desired result of sealing the orifice of the packing in contact with a reciprocating rod to prevent escape of liquid or gas between the rod and packing, need not be adjusted as frequently as in the case of a packing with the fibers otherwise disposed, and, therefore, the seal remains effective for a longer period of time with a given adjustment of the follower or gland, since the resilience of this packing enables the surface of the bore of the packing to repeatedly spring back and forth toward and from the surface of the rod reciprocating therethrough, which rod in practice usually has a slightly irregular surface. As the packing thus requires less force of contact with the reciprocating piston to maintain a gas tight seal, there is less friction on the piston and the packing has longer life.

This application is a continuation-in-part of my application 519,278, filed February 28, 1931.

The invention may be embodied in other specific forms without departing from the spirit or essential characteristics of the invention, and the present embodiment is therefore to be considered in all respects as illustrative and not restrictive, the scope of the invention being indicated by the appended claims rather than by the foregoing description, and all changes which come within the range of equivalents of the claims are therefore intended to be embraced therein.

I claim:

1. An article of manufacture comprising a die-extruded composition packing containing fibers and powdered unalloyed antimony, in which a major portion of the fibers extend in the direction of the longitudinal axis of the packing.

2. An article of manufacture consisting of a die-extruded tubular fiber-containing composition packing in which a major portion of the fibers extend in the direction of the longitudinal axis of the packing to provide in said article a maximum of resilience in compression.

3. An annular shaped packing consisting of a die-extruded packing composition containing metal particles and fibers, a major portion of the fibers extending in a direction substantially parallel to the bore.

4. An annular shaped packing consisting of a densified die-extruded packing composition containing metal particles and fibers, a major portion of the fibers extending in a direction substantially parallel to the bore.

5. An annular shaped packing consisting of a densified die-extruded packing composition containing metal particles and fibers, a major portion of the fibers extending in a direction substantially parallel to the bore, said packing having smooth surfaces and possessing plasticity and resilience.

6. An annular shaped packing having lubricating properties consisting of a die-extruded packing composition containing fibers, a major portion of said fibers extending in a direction substantially parallel to the bore of said packing.

7. An annular shaped packing having lubricating properties consisting of a die-extruded packing composition consisting essentially of fibers, particles of a solid lubricant, metal particles and rubber, a major portion of the fibers extending in a direction substantially parallel to the bore of the packing.

8. An annular shaped packing having lubricating properties consisting of a densified die-extruded packing composition consisting essentially of fibers, particles of a solid lubricant, metal particles and rubber, a major portion of the fibers extending in a direction substantially parallel to the bore of the packing, said packing having smooth surfaces and possessing plasticity and resilience.

9. An annular shaped packing having lubricating properties consisting of a die-extruded packing composition consisting essentially of fibers, particles of a solid lubricant, powdered unalloyed antimony and rubber, a major portion of the fibers extending in a direction substantially parallel to the bore of the packing.

10. An annular shaped packing having lubricating properties consisting of a densified die-extruded packing composition consisting essentially of fibers, particles of a solid lubricant, powdered unalloyed antimony and rubber, a major portion of the fibers extending in a direction substantially parallel to the bore of the packing, said packing having smooth surfaces and possessing plasticity and resilience.

WALTER RAUTENSTRAUCH.